United States Patent [19]

Sewell et al.

[11] Patent Number: 4,995,915
[45] Date of Patent: Feb. 26, 1991

[54] CLEANING GAS TURBINE FUEL NOZZLES

[75] Inventors: Charles A. Sewell, Lake Jackson; Robert D. Toles, Angleton, both of Tex.

[73] Assignee: The Dow Chemical Company, Midland, Mich.

[21] Appl. No.: 220,047

[22] Filed: Jul. 15, 1988

[51] Int. Cl.⁵ .............................................. B08B 3/08
[52] U.S. Cl. ................................ 134/22.14; 134/22.1; 134/22.12; 134/34
[58] Field of Search ................. 134/22.1, 22.11, 22.12, 134/22.14, 24, 34, 133, 166 R, 166 C, 167 R, 168 R, 184, 191; 239/589, 550, 600, 590, 553, 558; 166/304

[56] References Cited

U.S. PATENT DOCUMENTS 3,630,212  12/1971  Martin ............................. 134/22.14
4,508,577  4/1985  Conn et al. ........................... 134/24

Primary Examiner—Asok Pal

[57] ABSTRACT

An on-line system for cleaning dirty gas firing nozzles of an operating industrial gas turbine including injecting a suitable cleaning chemical at a specified rate into the gas fuel line just ahead of where the line enters the header supplying the nozzles through an injector quill equipped with a metering pump and check valves and tied into a chemical cleaner supply.

7 Claims, 3 Drawing Sheets

CLEANING GAS TURBINE FUEL NOZZLES

BACKGROUND OF THE INVENTION

This invention relates to a process for cleaning a gas turbine's fuel nozzles while the turbine is in operation.

Gas turbines, typically, may contain up to fourteen fuel gas nozzles being fed by a common gas header. The exit gas temperature at the exhaust of the gas turbine is usually monitored to determine the temperature spread of all the nozzles, that is, the temperature difference between the nozzle with the lowest temperature and the nozzle with the highest temperature. During operation of a gas turbine, it is important to minimize the exhaust temperature spread because an excessive temperature spread, for example more than 100 degrees Fahrenheit, creates thermal cycling which can lead to breakdown of turbine blades and shutdown of the turbine.

It has been found that plugging of fuel nozzles by liquids and particulate matter in the gaseous fuel can increase the temperature spread great enough to shut down a gas turbine operation. "Dirty" fuel containing, for example, hydrocarbon liquids, salts or sulfur contaminants, typically, can be fed into a gas turbine from, for example, underground or off-shore gas wells.

Heretofore, there has not been an adequate process for cleaning gas turbine gaseous fuel nozzles while the gas turbine is in operation. In the past, gas turbines had to be shutdown for several hours to allow cooling and subsequent removal and cleaning or replacement of fuel nozzles. These shutdowns cost users of gas turbines several thousand dollars per occurrence.

It is desired to provide a process for cleaning an operating gas turbine's gaseous fuel system to clean dirty gas firing nozzles reducing the differential in temperature between the highest and lowest monitored nozzle or turbine exhaust temperatures within a short period of time to avoid having to shutdown the unit to replace and/or clean the nozzles.

SUMMARY OF THE INVENTION

The present invention is directed to an on-line system for cleaning dirty gas firing nozzles of an operating industrial gas turbine, including injecting a sufficient amount of a suitable fluid cleaning chemical at a specified rate into the gas fuel system of the gas turbine sufficient to reduce deposits on the nozzles. Preferably, the injection of the cleaner takes place just ahead of where the line enters the header supplying the nozzles, for example, through an injector quill equipped with a metering pump and a check valve and tied into a chemical cleaner supply.

DETAILED DESCRIPTION OF THE PREFERRED EMBODIMENT(S)

In accordance with the present invention, a process for cleaning a gas turbine's fuel nozzles to reduce an excessive exhaust temperature spread includes adding a fluid cleaning medium to the gas turbine's fuel system during operation of the gas turbine.

The addition of the cleaning medium can be carried out continuously, but more preferably intermittently, for a period of a few seconds to a few hours with time intervals of from one day to one year duration The addition of the cleaning medium is effected by injection of the medium through a nozzle inserted into the gas turbine's fuel line header. A quill, known to those skilled in the art, is preferably used for the injection.

Figure 1:
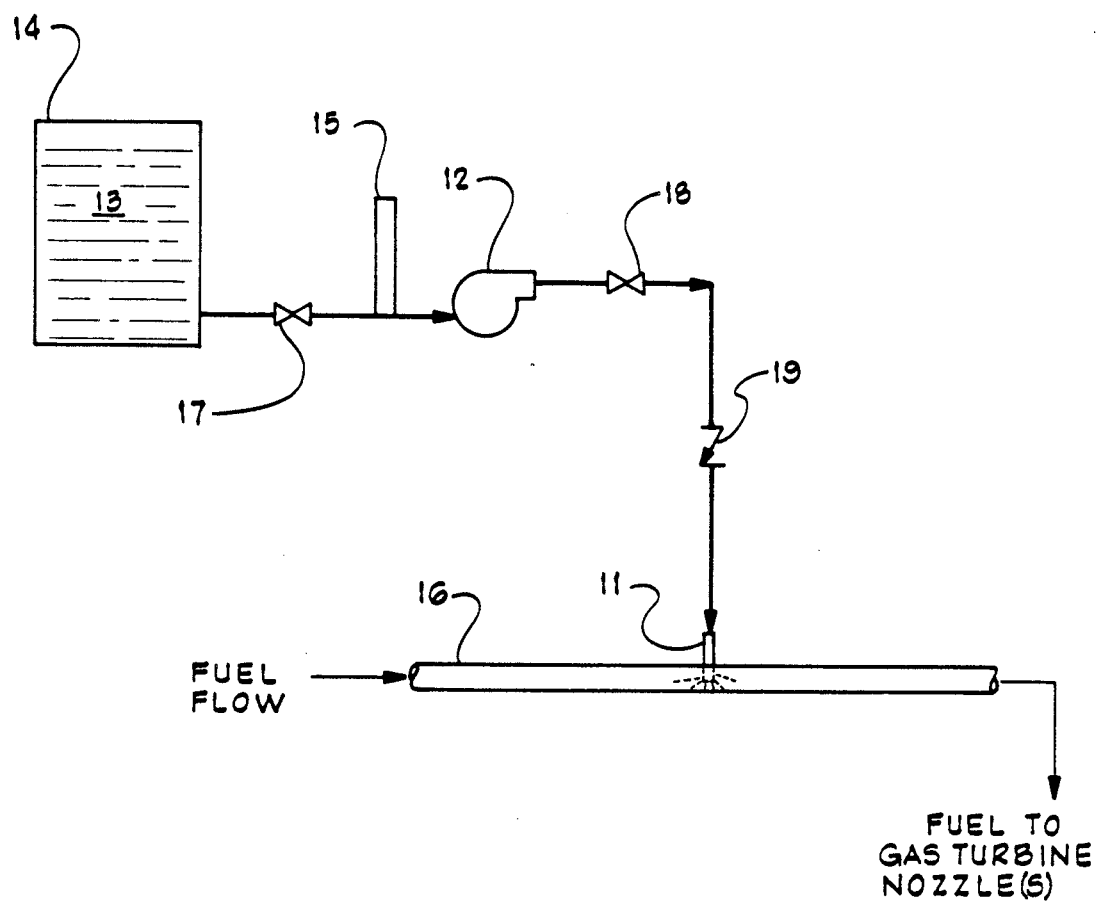
FIG. 1 is a schematic showing the cleaning system of the present invention.

In carrying out one embodiment of the process of the present invention and with reference to FIG. 1, there is shown a quill 11, permanently or removably, mounted to a gas turbine fuel line 16 for injecting cleaning medium into the gas turbine fuel line 16 and, in turn, into the gas turbine fuel nozzles. A pump 12 is used to pump cleaning medium 13 from a reservoir or container 14 containing a cleaning fluid 13. The injection quill 11 is preferably installed on the gas turbine's fuel gas line 16 a few feet ahead of where the line enters a header supplying the fuel nozzles. The injection quill 11 may be of any conventional design as long as it is sized to inject the desired amount of cleaning medium sufficient to clean the fuel nozzles. The injection quill 11 should be capable of injecting the liquid cleaner in such a way to effectively and intimately mix the cleaner with the fuel gas. For example, the cleaner can be injected in a finely atomized or mist form. An optional, desirable flow meter 15 and valve 17 are used to indicate the amount of cleaning medium used. An adjustable flow type pump or valve 18 can be used to control the flow of medium. A valve 19, preferably a check valve, is used to prevent fuel from entering the equipment upstream of the check valve 19.

The fluid cleaning medium is preferably a liquid cleaning chemical or mixture of liquid cleaning chemicals. The cleaning chemical suitable for use in the present invention should effectively dissolve deposits present on the gas turbine fuel nozzles. On the other hand, the cleaning chemical used should not contain any metals in quantities which will be harmful to a gas turbine's metallurgy. The cleaning liquid chemical is preferably a combustible liquid. Commercially available cleaning chemicals can be used, for example, an aqueous glycol ether solution commercially available from Nalco Chemical Company as Nalco 7952 or a custom mixed hydrocarbon based cleaner commercially available from Sermatech, Inc. as ECT, Inc. R-MC/T70.

In order for the liquid cleaning chemical to effectively clean all nozzles in the turbine, the liquid chemical should be injected on the gas turbine's fuel line upstream from the fuel nozzles. Generally, the liquid cleaning chemical is injected a few feet from the nozzles' common header. Advantageously, the injection takes place on-line without adversely affecting loading, firing, or exhaust temperature spread. The deposits on the nozzles dissolve and burn in the turbine and do not tend to clog the nozzles making the deposition problem worse. The on line chemical cleaning causes the temperature spread to improve by being decreased, and avoids a turbine outage to clean and replace nozzles.

The injection flow rate necessary to effect the cleaning may vary. Generally, the injection of the cleaning chemical is carried out at up to about 20 gallons of cleaner per 1000 KSCF (thousand standard cubic feed) per hour of fuel and preferably up to about.6 gallons per 1000 KSCF per hour of fuel. The injection of cleaner may take place until the temperature spread has returned to an acceptable level. If no improvement has been experienced within 48 hours, the temperature spread may be caused by a problem other than dirty fuel nozzles such as physical or mechanical combustion hardware problems. In such an instance, the turbine should be shut down for repairs according to the gas turbine manufacturer's guide lines on limits for temperature spread.

With reference to FIG. 1 again, the necessary tubing or piping is connected to the quill 11 from a suitable metering pump 12 capable of pumping, for example, over a range of up to about 20 gallons/hour at a pressure sufficient to inject the cleaning chemical into the fuel stream, for example, about 50 psig above the turbine's maximum gas line pressure. The temperature of the fuel gas should not exceed a temperature at which the cleaning chemical is adversely affected chemically or physically, such as by volatizing or decomposing, and thus reducing its cleaning capacity Preferably, the check valve 19 is installed in the line 16 near the quill 11 to prevent gas back flow from the quill. The pump 16 suction is tied into the chemical cleaner supply 14 via a suitable drawdown gauge 15 or other suitable means of measuring the liquid's flow into the system. Strategically located block valves 17 and 18, drain lines with other valves, and pressure gauges are desirable for controlling the additions of liquid cleaning chemical to the gas turbine fuel line 16 and for maintenance of the system.

The injection of liquid cleaning chemical is advantageously carried out during operation of a gas turbine. As an illustration of the present invention, while the gas turbine (not shown) is on-line, i.e. operating, a cleaner such as Nalco Chemical Company's Fire Prep 7952, ECT, Inc.'s R-MC/T70, or other suitable chemical cleaner is injected into the fuel line 16 at a rate, for example, of about 1 to about 2 gallons per hour per 1000 KSCF/hr for up to about 8-10 hours. Then, if the temperature spread has not improved, optionally, the flow may be increased to, for example, a rate of about 4 gallons per minute per 1000 KSCF/hr. The temperature spread should be closely monitored every few minutes when the injection is in progress. After a few hours have passed after injection, for example 8-10 hours, if results are not adequate, and the temperature spread is not at a critical level requiring shutdown of the turbine, the cleaner's flow may be optionally increased incrementally to the system's maximum capability, not exceeding 20 gallons/1000 KSCF per hour as aforementioned. Any number of injections at various injection rates may be utilized, if necessary, to obtain desired results.

Any gas turbine that on occasion experiences nozzle fouling or temperature spread problems can benefit from the present process.

EXAMPLE 1

Figure 2:
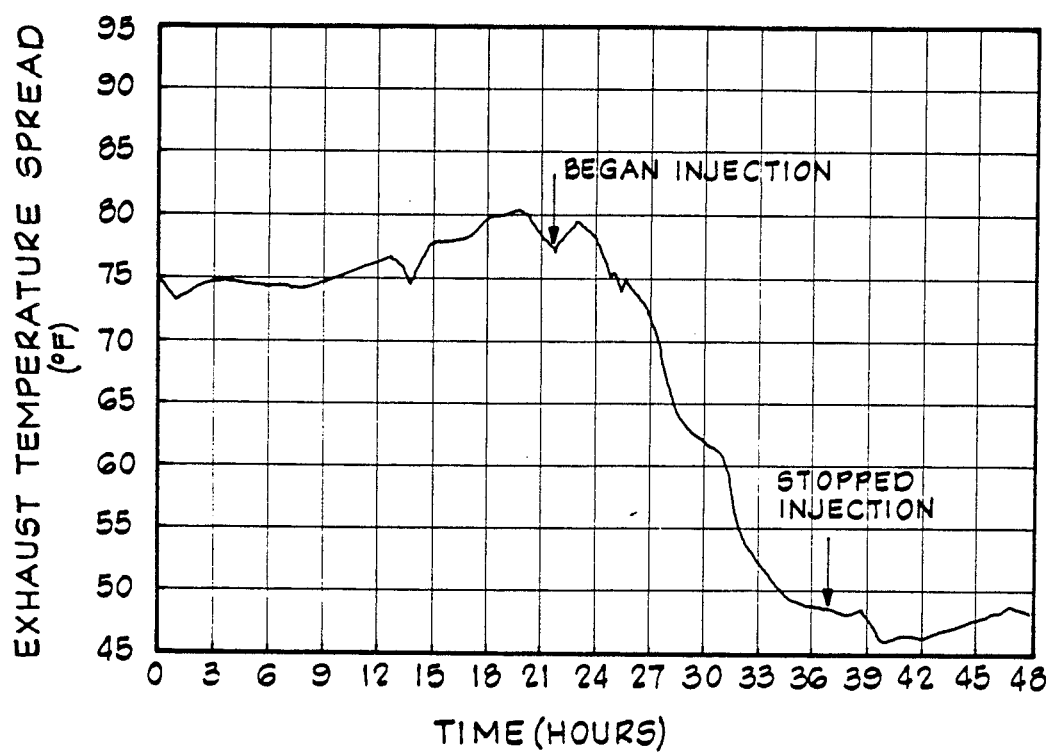
FIG. 2 is a graphical illustration of the temperature spread before and after using the cleaning system of the present invention.

A gas turbine, Westinghouse Model 501D5, manufactured by Westinghouse Corp., had a blade path temperature spread of 77 degrees Fahrenheit and data from previous days of operation indicated that this temperature spread was increasing. A cleaning agent, NALCO 7952 manufactured by Nalco Chemical Company, was pumped into the gas turbine's fuel line. At hour intervals the pump stroke settings were increased until a 90% pump stroke was achieved. Table I describes the results that were obtained at various points in time. The temperature spread was reduced from about 77 degrees F. to about 46 degrees F. over a period of time similar to the graphical illustration in FIG. 2. The equipment in this Example included a 55 gallon drum from which the cleaning fluid was pumped, a Milton Roy chemical feed pump, and an atomizing quill for fluid injection to the fuel gas stream. The cleaning agent was injected between the gas turbine's fuel gas control valve and the gas turbine's gas ring header.

TABLE I

| Time | Blade Path Temperature Spread (deg. F.) | Pump Stroke (%) | Flow Rate (GPH) | Quarts per KSCF of gas per hour |
|---|---|---|---|---|
| 9:05 am | 77 | 20 | 0.6 | 0.002 |
| 9:50 am | 87 | 30 | 0.9 | 0.003 |
| 10:20 am | 80 | 50 | 1.5 | 0.005 |
| 11:00 am | 76 | 70 | 2.1 | 0.007 |
| 12:00 pm | 75 | 90 | 2.7 | 0.009 |
| 2:00 pm | 71 | 90 | 2.7 | 0.009 |
| 5:00 pm | 61 | 90 | 2.7 | 0.009 |
| 8:00 pm | 50 | 90 | 2.7 | 0.009 |
| 3:30 am | 46 | turned pump off | | |

EXAMPLE 2

Figure 3:
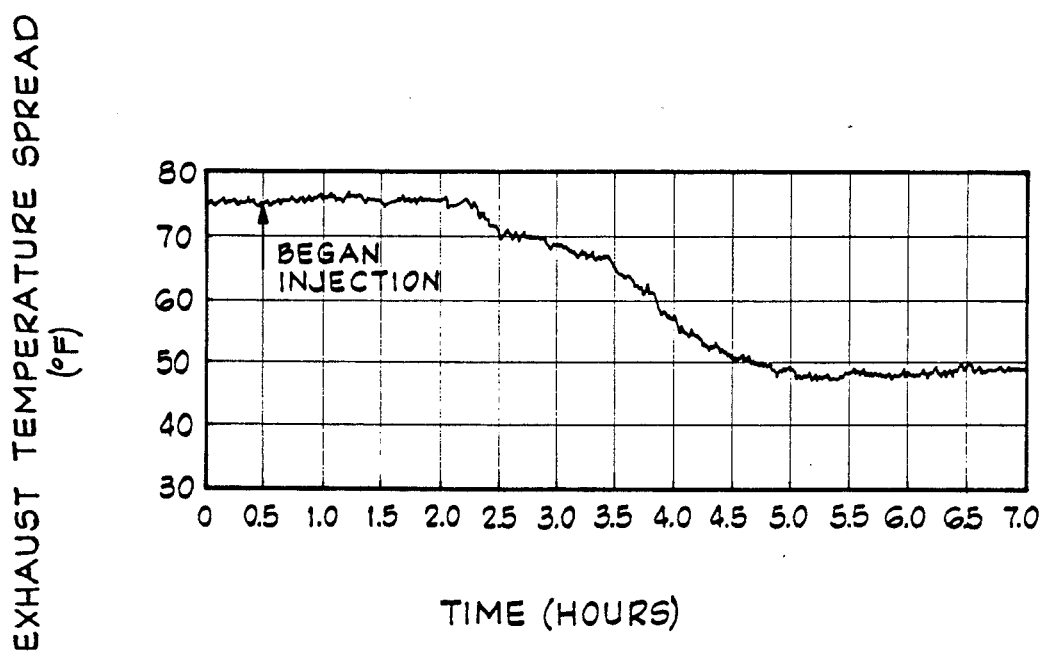
FIG. 3 is another graphical illustration of the temperature spread before and after using the cleaning system of the present invention.

The equipment and injection system used in this example were the same as in Example 1. The gas turbine of Example 1, on a separate occasion, had a blade path temperature spread of 77 degrees F. The Nalco cleaning agent of Example 1 was used in this example. The cleaning agent was pumped into the gas turbine's fuel line at a rate of approximately 2 gallons/1000 KSCF per hour of fuel gas for several hours and this dramatically reduced the temperature spread to approximately 47 degrees F. as graphically illustrated in FIG. 3.

What is claimed is:

1. A process for on-line cleaning of gas turbine fuel nozzles comprising injecting a sufficient amount of a fluid cleaning medium into a fuel system of an operating gas turbine at a rate sufficient to reduce deposits on the gas turbine fuel nozzles.

2. The process of claim 1 wherein the rate is up to about 20 gallons per 1000 KSCF per hour of fuel.

3. The process of claim 1 wherein the fluid cleaning medium is a liquid.

4. The process of claim 3 wherein the liquid is a combustible liquid.

5. The process of claim 1 wherein the injection is intermittently carried out.

6. The process of claim 1 wherein the amount of fluid cleaning medium is increased incrementally.

7. In the operation of a gas turbine including feeding a gaseous fuel to at least one gas nozzle the improvement comprising injecting a sufficient amount of a fluid cleaning medium into the gaseous fuel of the operating gas turbine at a rate sufficient to reduce deposits on the gas turbine fuel nozzles.

* * * * *